350-174.
XR  3,858,982  SR

Meckler

[11] 3,858,982
[45] Jan. 7, 1975

[54] APPARATUS FOR CENTERING SPECTACLE LENSES, AND FOR ATTACHING A MOUNT TO THE SPECTACLE LENS

[75] Inventor: Helmut H. Meckler, Dusseldorf, Germany

[73] Assignee: Wernicke & Co. K.G., Dusseldorf, Germany

[22] Filed: Apr. 9, 1973

[21] Appl. No.: 348,912

[30] Foreign Application Priority Data
Apr. 26, 1972  Germany............................ 2220373

[52] U.S. Cl.................. 356/127, 356/171, 350/247
[51] Int. Cl. .............................................. G01b 9/00
[58] Field of Search................. 269/296; 51/216 LP; 356/127, 138, 139, 165, 166, 171, 172, 124, 125, 126; 350/247, 251

[56] References Cited
UNITED STATES PATENTS

| | | |
|---|---|---|
| 2,807,982 | 10/1957 | McLeod............................ 356/167 |
| 3,049,766 | 8/1962 | Buckminster.................. 51/216 LP |
| 3,645,632 | 2/1972 | Schmidt et al..................... 356/127 |

*Primary Examiner*—Ronald J. Stern
*Assistant Examiner*—Conrad Clark
*Attorney, Agent, or Firm*—James M. Heilman; William O. Heilman; Anthony J. Casella

[57] ABSTRACT

Apparatus for centering lenses, especially spectacle lenses having an added lens component for viewing near objects. Two beam splitters are employed to combine the images of a frame template and a protractor which includes a scale of angles. An optical viewing system combines these images and superimposes them on a lens to be centered and ground to the shape of the template. A resilient mount holds the lens in a manually adjustable position and means are provided for attaching a suction cup to the lens after adjustment for transfer to the edge grinder.

12 Claims, 3 Drawing Figures

APPARATUS FOR CENTERING SPECTACLE LENSES, AND FOR ATTACHING A MOUNT TO THE SPECTACLE LENS

The invention relates to apparatus for centering spectacle lenses, more particularly bifocal spectacle lenses with a near part, and for attaching a mount to the spectacle lens for insertion into a lens edge grinding machine.

This invention relates to United States patent application, Ser. No. 362,039 filed by Joseph R. Reiner, and entitled "Device for Centering Spectacle Lenses With Respect To Template And Graduated Scale," filed May 18, 1973 and assigned to the assignee of the subject application. German patent specification No. 1,147,774 relates to a device for centering spectacle lenses for edge grinding, in which device the lens is placed by means of a rubber cup or the like on a support so that the desired peripheral shape may be imparted to the lens in a grinding machine by copying from a template. In this known device decentering of the lens with respect to the center of rotation of the template or of the support is referred to an angle scale with a center cross. To this end a beam-splitting partially reflecting surface, by means of which the protractor scale is reflected into the optical observation path is placed between the operator's eye and the spectacle lens which is to be centered, so that the operator sees the lens, template and scale superimposed and can move the lens into the correct position by reference to the scale and template before securing the lens to the mount for subsequent grinding. It has been found that the "near" part of bifocal lenses cannot be readily made visible and frequently cannot be made clearly visible by the known devices. However, it is not only the "near" part but also the contour of the lens itself which is frequently not clearly visible in the known device.

The present invention resides in apparatus for centering a spectacle lens preparatory to mounting the lens in an edge-grinding machine, which apparatus comprises lens-supporting means in predetermined relation to an optical viewing system arranged to superimpose images of a lens template and a scale of angles on a lens supported by the supporting means, which lens-supporting means includes first support means arranged to engage peripheral regions of one surface of a lens, second support means arranged to engage peripheral regions of the opposite surface of the lens, at least one said support means being movable against a resilient bias urging the support means into a lens-engaging condition to accommodate differences in lens size and shape while permitting sideways adjustment of the lens, a light source spaced from the lens support position and arranged to illuminate that surface of the lens opposite the surface viewed through the viewing system and guiding means associated with the lens-supporting means for grinding into engagement with the lens after centering thereof a member for mounting the lens for grinding.

The invention also resides in apparatus for centering spectacle lenses and for attaching a mounting part to the spectacle lens for insertion into an edge grinding machine, comprising a beam splitter disposed between the operator's eye and the spectacle lens for reflecting a template and a scale of angles into the optical observation path, the spectacle lens being retained by spring pressure on a plurality of supporting rods between a light source and the beam splitter and being slidable on the support rods in the plane of the lens.

In the present apparatus the periphery and, in the case of bifocals, the "near" part of spectacle lenses become clearly visible while the lenses are centered, so that it is easy to determine during the centering operation whether the lens is big enough for the template and whether a sufficiently large portion of the "near" part is disposed within the lens periphery which is to be produced by the subsequent grinding operation and has the desired position on the finished lens.

Placing the spectacle lens directly on a base would result in undesirable shadows and light rings and the short distance between the spectacle lens and the support, which may for instance comprise a ground glass diffusion filter screen, does not produce any suitable light effect for making the periphery and the "near" part visible.

In one embodiment of the invention the support rods are longitudinally slidable and spring biased by a spring and are provided with stop abutments, the grinding machine mount being insertable into a vertically adjustable and lockable support arm.

Preferably the support arm is provided with studs which are coaxial relative to the support rods, the free ends of the said studs, preferably provided with protective caps, bearing upon the spectacle lens.

A ground glass diffusion filter screen is preferably disposed between the light source and the spectacle lens. The said screen may form guides and stop abutments for the support rods.

The support rods may be lockable to a housing of the device, at least in one direction of motion of the said support rods, so that they may be secured against sliding in the aforementioned direction. To this end the support rods may be disposed concentrically relative to the optical viewing path and, being locked by means of a locking ring which is provided with ramp edges or surfaces. According to a further embodiment of the invention the support rods may differ from each other and the studs of the vertically adjustable support arm may be thrust by spring force against the support rods, the support rods being non-slidable In the embodiment in which the support rods are slidable against spring pressure means may be provided for sliding all the rods simultaneously to allow insertion and removal of a lens, the support arm being vertically fixed. To this end, the support rods may be adjustable together by means of a member which engages in recesses of the support rods, the said recesses preferably having a width which is greater than the thickness of the member.

Embodiments of the invention are illustrated in the accompanying drawings in which.

Figure 1:
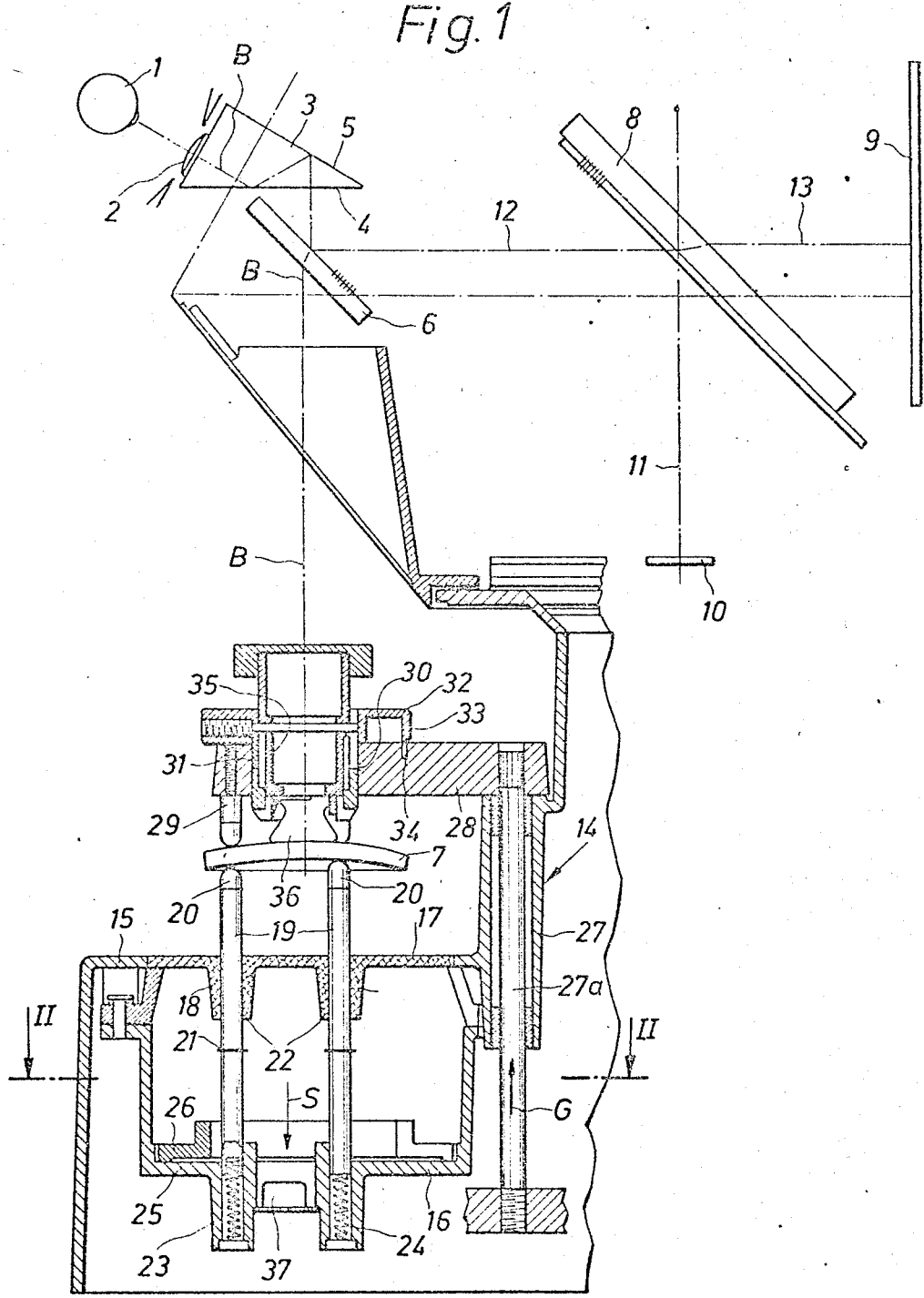
FIG. 1 is a cross-sectional view of one form of centering apparatus.
Figure 2:
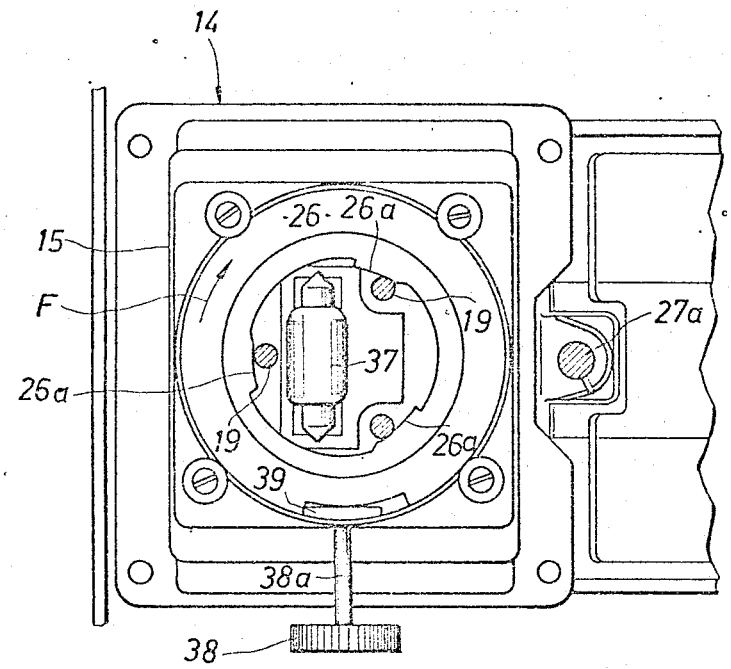
FIG. 2 is a section along the line II—II of FIG. 1.

The apparatus shown in FIGS. 1 and 2 has a lens 2 situated in front of the operator's eye 1 on a prism 3 by whose surfaces 4, 5 the optical observation path B is deflected into a vertical direction. After leaving the prism 3 the optical path B passes through a beam splitter 6 which may be a partially reflecting mirror or a prism. After leaving the beam splitter 6 the vertical optical observation path B strikes the spectacle lens 7 so that this lens may be observed by the eye 1.

A second beam splitter 8, behind which is a protractor scale 9 and below which a template 10 is mounted, is disposed at one side of the optical observation path B. The optical paths 11, 13 are combined by the beam splitter 8 into an optical path 12 which at the beam splitter 6 joins the upper portion of the optical path B so that the eye is able to see simultaneously the spectacle lens 7, the protractor scale 9 and the template 10. The spectacle lens 7 may be a bifocal lens incorporating a "near" part which, in addition to the peripheral contour of the lens 7, is to be made clearly visible to the eye.

The part 14 of the apparatus which supports the spectacle lens 7 has a casing 15 the interior of which supports a cup-shaped member 16. A ground glass diffusion filter screen 17, forming a lid, is disposed on the member 16, or on the casing 15 above the member 16 and has guides 18 for support rods 19 which are disposed concentrically with respect to the optical observation path B. At their upper ends, the said support rods have protective caps 20 of rubber or the like on which the spectacle lens 7 is supported. In their middle regions the support rods 19 are provided with stop rings 21 which co-operate with the lower ends 22 of the guides 18 to function as stops. Springs 24, which urge the support rods 19 upwardly, bear on the bases of further support rod guides 23 provided in member 16. This enables the support rods 19 to move independently longitudinally against the thrust of the springs 24 so that their vertical position may be adapted to the position and curvature of the lens.

A locking ring 26, whose internal edge is provided with ramps 26a (FIG. 2) and surrounds the support rods 19 concentrically, rests on the base 25 of the member 16. The ring and its ramps are arranged so that rotation of the ring in the direction opposite to the rise of the ramps 26a (arrow F in FIG. 2) causes the ramps to engage and locate the support rods 19 at a specific height. Rotation of the ring 26 in the opposite direction releases the support rods 19 for further adjustment in the longitudinal direction. The ring 26 can simply rest on the base 25 because it only has to prevent the support rods 19 from sliding longitudinally downwards in the direction of the arrow S in FIG. 1.

The casing 15 has a vertical sleeve 27 through which a column 27a extends. The said column can be slid upwardly in the bushing 27 in the direction of the arrow G from the position illustrated in FIG. 1, and can be fixed in its lower lens-engaging position (illustrated in FIG. 1) as well as in its upper position, or it may be self-locking. At its upper end, the column 27a is secured to a transverse support arm 28 which is preferably transparent and whose underside carries studs 29 which are co-linear with the support rods 19 and may also be provided with rubber caps by means of which the said studs bear against the top of the spectacle lens 7. Concentrically to the studs 29, the support arm 28 has a bore 30 into which an insert member 31 can be inserted. The member 31 is provided on one side with an extension 32 whose downwardly oriented portion 33 projects into a recess 34 of the support arm 28 so that the insert member 31 is secured against rotation about its longitudinal axis in the bore 30.

The insert member 31 is provided with a holder 35 which is slidable in the insert member and is retained therein e.g., by a transverse pin. At its lower end, the holder 35 supports a suction cup 36 which is pressed onto the top of the spectacle lens 7. After being secured to the spectacle lens, the suction cup can be detached from the holder 35 and used for attaching the lens to a mount for mounting the lens in an edge-grinding machine.

Devices other than the illustrated suction cup 36 and its holder 35 may be employed for attaching a grinding machine mounting part, for example a known metal block may be attached in place of a suction cup to the top of the lens.

In use, the arm 28 is initially in its uppermost position and the spectacle lens 7 is placed on the slidable support rods 19. The support arm 28 and column 27a are then released from the upper position and guided downwardly into their lowest position where the column is one again locked. During this operation the support rods 19 move downwardly against the thrust exerted by the springs 24 so that the spectacle lens is resiliently retained between the studs 29 and the support rods 19. When the parts are in this position, the spectacle lens can be laterally and radially displaced with reference to the images of the template 10 and scale 9 until it is in the correct position. The lens periphery and the "near" part are made clearly visible by the light emitted by a tubular lamp 37 and passing through the filter diffusion screen 17; because the spectacle lens 7 is retained at a distance from the aforementioned screen, no shadows or light rings of the spectacle lens become visible to the eye.

The support rods 19 are then locked by means of the ring 26 against axial displacement in the direction of the arrow S by the ring 26, which is rotated by means of a knurled wheel 38 having a spindle 38a and friction wheel 39 engaging ring 26. The suction cup 36 is then thrust by means of its holder 35 against the lens 7, which is held in the correct position by studs 29 and the locked rods 19.

After the suction cup 36 has adhered to the spectacle lens 7 to retain the latter, the arm 28 and column 27a are again moved into their uppermost position where they are locked and the spectacle lens is removed. The ring 26 is then released so that the support rods 19 are again under spring bias.

Figure 3:
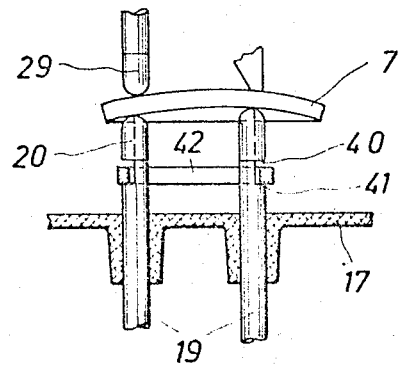
FIG. 3 shows a detail of a modified embodiment.

In a modification, shown in FIG. 3, the arm 28 is fixedly joined to the casing 15 or a part corresponding to the bush 27, in the position illustrated in FIG. 1. The support rods 19 are provided with recesses 40 each of which form a lower shoulder 41 in which a common ring 42 engages which bears against the shoulders 41 of the recesses with axial play. The support rods 19 may be thrust downwardly together by means of the aforementioned ring 42 to permit insertion of the lens 7. Since the recesses 40 have an axial width which is greater than the thickness of the ring 42, it is nevertheless possible for the support rods 19 to set themselves at different heights to bear against the underside of the spectacle lens. The top of the spectacle lens 7 is first placed against the studs 29 while the support rods 19 are held down by the ring 40 so that a space is provided between the studs 29 and the support rods 19. Thereafter the ring 40 is gradually released until the support rods 19 bear upon the underside of the lens 7, whereupon the spectacle lens is once again adjusted between the studs 29 and the support rods 19, the eye 1 observing the template 10 and the protractor scale 9 as well as the lens in the same way as when operating the embodiment illustrated in FIGS. 1 and 2. When the spectacle lens 7 has reached the desired position, the rods 19 are again secured by the ring 26 and a suction cup attached. To remove the lens, the ring 26 is released and the support rods 19 are are lowered by means of the ring 42.

What we claim is:

1. Apparatus for centering a spectacle lens preparatory to mounting the lens in an edge-grinding machine, which apparatus comprises lens-supporting means in predetermined relation to an optical viewing system arranged to superimpose images of a lens template and a scale of angles on a lens supported by the supporting means, which lens-supporting means includes first support means arranged to engage peripheral regions of the upper surface of the lens, second support means arranged to engage peripheral regions of the opposite surface of the lens, said second support means being movable against a resilient bias urging the second support means into a lens-engaging condition to accommodate differences in lens size and shape while permitting sideways adjustment of the lens, each of said first and second support means including a plurality of elongated rods disposed in spaced relationship to make point contact with the peripheral regions of the respective lens surface, a light source spaced from the lens support position and arranged to illuminate that surface of the lens opposite the surface viewed through the viewing system, and guiding means associated with the lens-supporting means for guiding into engagement with the lens after centering thereof a member for mounting the lens for grinding.

2. Apparatus as claimed in claim 1, further including a vertically adjustable and lockable support arm in which said mounting member is insertable for engagement with the lens.

3. Apparatus as claimed in claim 2 wherein said support arm is provided with studs which are coaxial relative to the support rods of the first support means.

4. Apparatus according to claim 3 wherein the support rods of the first support means are fixed to said vertically adjustable support arm.

5. Apparatus according to claim 1 wherein a ground glass filter diffusion screen is disposed between the light source and the spectacle lens.

6. Apparatus according to claim 5 wherein the ground glass filter diffusion screen forms guides and stop abutments for the support rods.

7. In an apparatus for centering a spectacle lens having a slightly curved planar surface and for attaching a mounting part to the spectacle lens for insertion into an edge grinding machine wherein a beam splitter is disposed between the operator's eye and the spectacle lens for reflecting a template and a scale of angles into the optical observation path, the improvement wherein the spectacle lens is retained by spring pressure on a plurality of supporting rods between a light source and the beam splitter, and is slidable on said support rods in the plane generally parallel to said planar surface of the lens.

8. Apparatus according to claim 7 wherein the support rods are longitudinally slidable and each is spring-biased.

9. Apparatus according to claim 8 wherein the support rods are coupled to a casing of the apparatus to be secured against sliding transverse to their directions of motion.

10. Apparatus according to claim 9 wherein the support rods are disposed in an array concentric to the optical viewing path and can be locked against movement along their longitudinal axes by means of a rotatable locking member which is provided with ramp edges or surfaces for engaging the rods on rotation of the locking member.

11. Apparatus according to claim 8 wherein the support rods can be slid in common in the direction of their longitudinal axes against spring-pressure.

12. Apparatus according to claim 11 wherein the support rods can be slid in common by a member which engages respective recesses in the support rod.

* * * * *